M. T. THOMAS.
SHAFT COUPLING.
APPLICATION FILED FEB. 1, 1910.
972,292.
Patented Oct. 11, 1910.
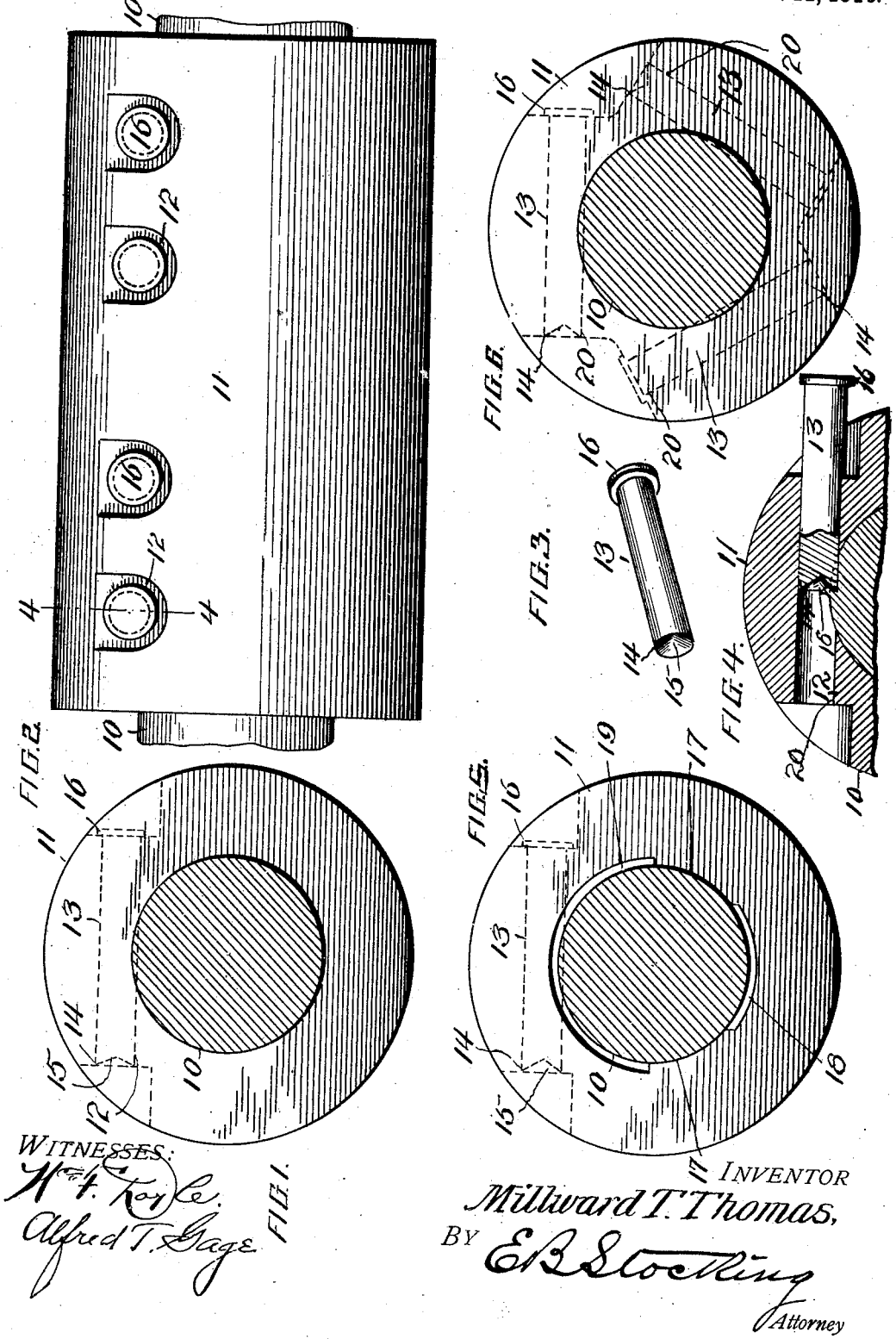
WITNESSES
INVENTOR
Millward T. Thomas,
BY
Attorney

UNITED STATES PATENT OFFICE.

MILLWARD T. THOMAS, OF WARREN, PENNSYLVANIA.

SHAFT-COUPLING.

972,292.  Specification of Letters Patent.  Patented Oct. 11, 1910.

Application filed February 1, 1910. Serial No. 541,390.

*To all whom it may concern:*

Be it known that I, MILLWARD T. THOMAS, a citizen of the United States, residing at Warren, county of Warren, State of Pennsylvania, have invented certain new and useful Improvements in Shaft-Couplings, of which the following is a specification, reference being had therein to the accompanying drawing.

This invention relates to a shaft coupling and particularly to means for securing the inclosing casing of the shaft sections to said section.

The invention has for an object to provide a novel and improved construction of drive pin adapted to be disposed in a lateral seat extending through the casing tangentially to the inner face thereof, whereby the cutting edges, formed at one end of the pin, produce a groove or way transversely of the shaft which effects a tight fit for the pin and prevents movement of the shaft within the casing.

Other and further objects and advantages of the invention will be hereinafter set forth and the novel features thereof defined by the appended claims.

In the drawing—Figure 1 is an end elevation of the casing disposed upon a shaft; Fig. 2 is a side elevation thereof; Fig. 3 is a detail perspective of the drive pin; Fig. 4 is a detail section on line 4—4 of Fig. 5, showing the pin partially entered into holding position; Fig. 5 is an end elevation of a modified form of the casing; and Fig. 6 is a similar view of a modified application of the pin.

Like numerals of reference refer to like parts in the several figures of the drawing.

The numeral 10 designates the shaft sections which are inclosed within a casing 11 at their adjacent ends. This casing may be of any desired construction and configuration and is provided with one or more laterally extending seats 12 which preferably entirely traverse the casing and are disposed tangentially to the inner face thereof so as to transversely intersect the curved periphery of the shaft as shown in Figs. 1 and 4. The seats are adapted to receive the drive pins 13 which are provided at one end with a cutting edge 14 of any preferred construction, for instance comprising a conical depression 15 which forms an annular cutting edge 14 so that the pin may be introduced in any position. This depression also provides a recess to receive a tool when the pin is to be driven out for the purpose of removing the casing from the shaft. The opposite end of the pin may be formed with a head 16, if desired, which limits its inward movement and provides a convenient surface for driving the pin into position.

In the modified form of the invention shown in Fig. 5, the casing is provided with oppositely disposed bearing faces 17 and clearance ways 18 and 19 at opposite ends thereof. The drive pin 13 traverses the latter way and coöperates with these faces by forcing the shaft 10 into contact therewith while preventing its movement within the casing.

In Fig. 6 a modified form is shown where a plurality of the drive pins 13 are used, they being disposed in seats or ways 20 located at an angle to each other and disposed tangentially to both the inner face of the casing and the periphery of the shaft.

In the application of the invention, the shaft is not provided with any groove or way and after the casing has been slipped thereon, the pin is introduced into its seat and driven transversely of the shaft by any desired tool. During this driving action, a cut or groove is formed in the curved periphery of the shaft by the cutting edge of the pin and the material thus removed forced outward at the opposite side of the casing and from that where the pin was introduced. This action securely keys the shaft and casing together and prevents accidental loss of the pin as by cutting its own groove in the shaft, an absolutely tight fit is secured which prevents any movement between the parts. If it be desired to remove the casing, the pin may be driven out by applying a suitable tool to the cutting end thereof.

The invention provides a construction adapted for application to any shaft without previous preparation of the shaft and forms an efficient, simple and economically constructed form of shaft coupling.

Having described my invention and set forth its merits, what I claim and desire to secure by Letters Patent is—

1. In a shaft coupling, a casing having a lateral pin seat disposed tangentially to the inner face of the casing, and a drive pin within said seat and provided with a cutting edge at one end.

2. In a shaft coupling, a casing having a lateral pin seat disposed tangentially to the inner face of the casing, and a drive pin within said seat and provided with a curved cutting edge at one end.

3. In a shaft coupling, a casing having a lateral pin seat disposed tangentially to the inner face of the casing, and a drive pin within said seat and provided with a depression at one end surrounded by an annular cutting edge.

4. In a shaft coupling, a casing having a lateral pin seat disposed tangentially to the inner face of the casing, and a drive pin within said seat provided with a head at one end and a cutting edge at its opposite end.

5. In a shaft coupling, a casing having a series of lateral pin seats disposed tangentially to the inner face of said casing and at an angle to each other, and a series of drive pins within said seats and each provided with a cutting edge at one end.

In testimony whereof I affix my signature in presence of two witnesses.

MILLWARD T. THOMAS.

Witnesses:
L. A. BRANCH,
W. A. CAMERON.